US012195302B2

(12) United States Patent
Roussel

(10) Patent No.: US 12,195,302 B2
(45) Date of Patent: Jan. 14, 2025

(54) SAFETY MONITORING DEVICE, AND METHOD FOR MONITORING THE SAFETY OF AN ELEVATOR SYSTEM

(71) Applicant: Inventio AG, Hergiswil (CH)

(72) Inventor: Frank Olivier Roussel, Lucerne (CH)

(73) Assignee: INVENTIO AG, Hergiswil (CH)

( * ) Notice: Subject to any disclaimer, the term of this patent is extended or adjusted under 35 U.S.C. 154(b) by 0 days.

(21) Appl. No.: 17/907,280

(22) PCT Filed: Mar. 15, 2021

(86) PCT No.: PCT/EP2021/056450
§ 371 (c)(1),
(2) Date: Sep. 26, 2022

(87) PCT Pub. No.: WO2021/197811
PCT Pub. Date: Oct. 7, 2021

(65) Prior Publication Data

US 2023/0109720 A1 Apr. 13, 2023

(30) Foreign Application Priority Data

Mar. 31, 2020 (EP) .................................... 20167065

(51) Int. Cl.
*B66B 13/22* (2006.01)
*B66B 1/34* (2006.01)
*B66B 3/00* (2006.01)

(52) U.S. Cl.
CPC ............ *B66B 13/22* (2013.01); *B66B 1/3461* (2013.01); *B66B 3/002* (2013.01)

(58) Field of Classification Search
CPC ....... B66B 3/002; B66B 1/3461; B66B 13/22; B66B 5/0031; H01H 2231/03
See application file for complete search history.

(56) References Cited

U.S. PATENT DOCUMENTS 4,674,604 A 6/1987 Williams
4,977,984 A * 12/1990 Arnosti .................... G01V 8/20
187/394

(Continued)

FOREIGN PATENT DOCUMENTS

CN 102190216 A 9/2011
EP 2319791 A1 5/2011

(Continued)

*Primary Examiner* — Michael A Riegelman
(74) *Attorney, Agent, or Firm* — Shumaker, Loop & Kendrick, LLP; William J. Clemens

(57) ABSTRACT

A safety monitoring device of an elevator system having a shaft extending over at least two floors has a safety circuit with door contact switches being closed or opened accordingly when a respective shaft door is closed or opened. The door switches form an electrical series circuit that is electrically broken to block the elevator car from moving when any of the door switches is opened. The monitoring apparatus has at least one bypass switch that actuates a first door switch for a first shaft door on a first floor such that, when the elevator car reaches the first floor, the bypass switch bypasses the first door switch to switch the safety circuit independently of the first door switch. A monitoring means of the monitoring apparatus monitors the switching state of the safety circuit and/or of a second door switch for a second shaft door on a second floor.

16 Claims, 2 Drawing Sheets

(56) References Cited

U.S. PATENT DOCUMENTS

| | | | | |
|---|---|---|---|---|
| 6,193,019 | B1 * | 2/2001 | Sirigu | B66B 13/22 187/391 |
| 6,446,760 | B1 * | 9/2002 | Lisi | B66B 13/22 187/391 |
| 7,905,330 | B2 * | 3/2011 | Jahkonen | B66B 5/0018 187/316 |
| 10,227,208 | B2 * | 3/2019 | De Coi | B66B 5/0031 |
| 10,526,169 | B2 * | 1/2020 | Muller | B66B 5/0031 |
| 11,305,965 | B2 * | 4/2022 | Lindegger | B66B 5/027 |
| 11,618,648 | B2 * | 4/2023 | Birrer | B66B 1/50 187/393 |
| 2009/0255762 | A1 * | 10/2009 | Ketonen | B66B 5/0068 702/182 |
| 2009/0321192 | A1 * | 12/2009 | Kattainen | B66B 5/0056 187/279 |
| 2012/0186914 | A1 * | 7/2012 | Birrer | B66B 5/0031 187/247 |
| 2016/0221793 | A1 * | 8/2016 | De Coi | B66B 5/0031 |
| 2016/0311653 | A1 * | 10/2016 | Müller | B66B 13/22 |
| 2017/0001841 | A1 * | 1/2017 | Drouet | B66B 13/22 |
| 2019/0002239 | A1 * | 1/2019 | Zimmerli | B66B 5/0031 |
| 2019/0119067 | A1 * | 4/2019 | Sonnenmoser | H04L 12/423 |
| 2019/0300337 | A1 * | 10/2019 | Lindegger | B66B 13/22 |
| 2020/0346893 | A1 * | 11/2020 | Birrer | B66B 9/00 |
| 2021/0101781 | A1 * | 4/2021 | Roussel | B66B 5/0031 |
| 2021/0101783 | A1 * | 4/2021 | Roussel | B66B 3/002 |
| 2022/0017327 | A1 * | 1/2022 | Adifon | B66B 19/007 |
| 2023/0002192 | A1 * | 1/2023 | Roussel | B66B 5/005 |
| 2023/0002196 | A1 * | 1/2023 | Tian | B66B 5/027 |
| 2023/0109720 | A1 * | 4/2023 | Roussel | B66B 1/3461 187/325 |
| 2024/0051791 | A1 * | 2/2024 | Ruhnke | B66B 13/14 |

FOREIGN PATENT DOCUMENTS

| | | | |
|---|---|---|---|
| WO | 9719459 | A1 | 5/1997 |
| WO | 0051929 | A1 | 9/2000 |
| WO | 02081353 | A1 | 10/2002 |
| WO | 03080495 | A1 | 10/2003 |
| WO | 2004096690 | A1 | 11/2004 |
| WO | 2010072658 | A1 | 7/2010 |
| WO | 2017008849 | A1 | 1/2017 |
| WO | 2018010991 | A1 | 1/2018 |
| WO | 2019086205 | A1 | 5/2019 |
| WO | 2019219406 | A1 | 11/2019 |

* cited by examiner

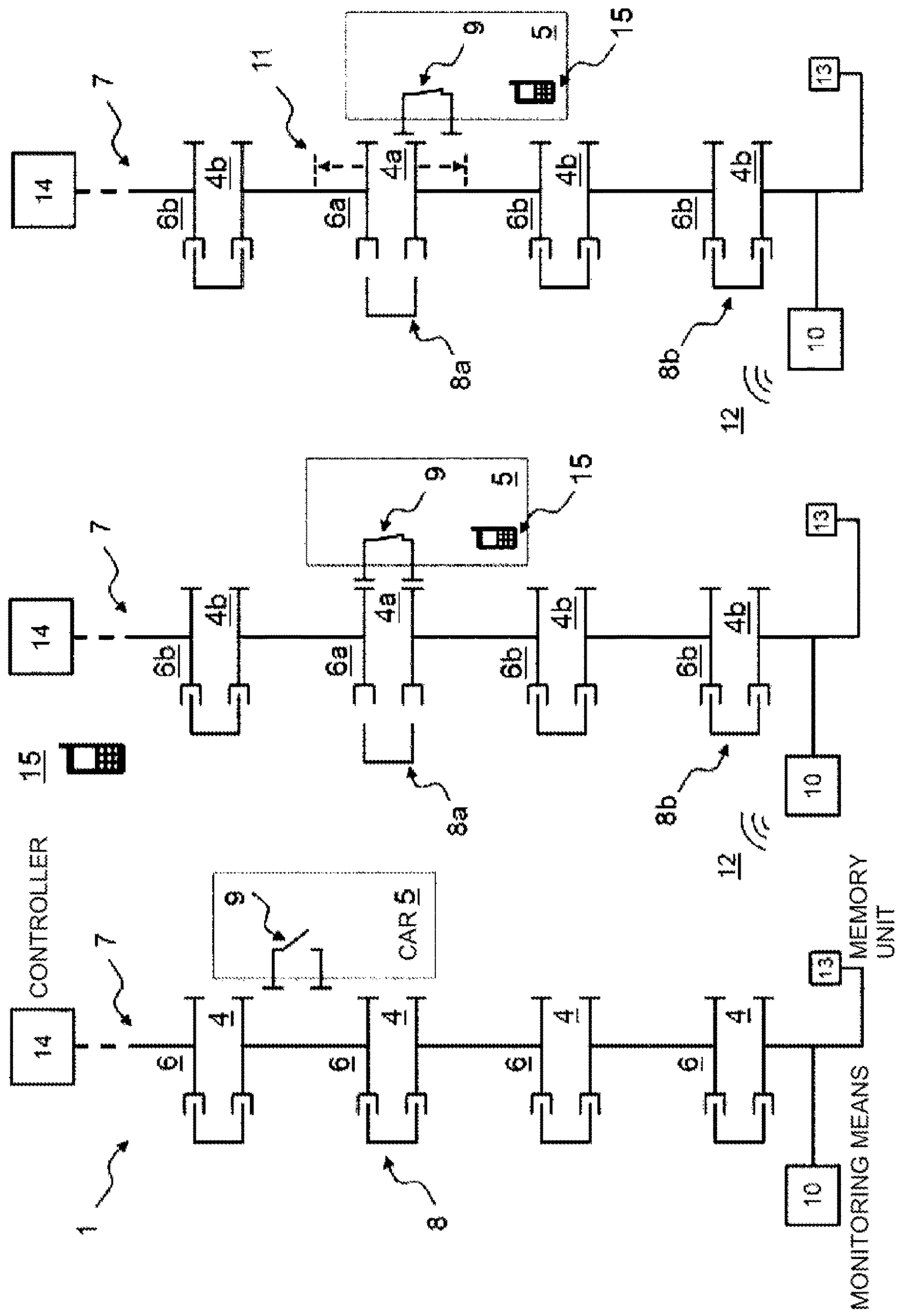
FIG. 2.1
FIG. 2.2
FIG. 2.3

SAFETY MONITORING DEVICE, AND METHOD FOR MONITORING THE SAFETY OF AN ELEVATOR SYSTEM

FIELD

The present invention relates to a safety monitoring device for an elevator system and to a method for monitoring the safety of an elevator system. The invention further relates to an elevator system which has such a safety monitoring device or is monitored by the method.

BACKGROUND

An elevator system serves to transport people within a building by vertically displacing an elevator car between different floors of the building. In order to be able to ensure the safety of passengers or service personnel, many safety-relevant components must be monitored within the elevator system in order, for example, to then be able to operate or control the elevator system in a suitable and safe manner. A so-called safety chain (safety circuit) is conventionally used in the elevator system, which has a large number of sensors or switches that can be used to determine signals or information about current states of the safety-relevant components. Such sensors and switches are connected to one another in the form of an electrical series circuit. If a link in the safety chain is broken, e.g. a component fails, the entire safety chain is electrically broken, so that the elevator system is immediately put out of service, in particular to prevent an elevator car from moving. Thus, the immediate safety of the elevator system can be ensured. Examples of a safety apparatus for elevator systems and the operation thereof are given, inter alia, in CN 102190216, WO 2000051929 and WO 2017008849.

A door contact switch (KTS) is typically provided on each shaft door and the car door of an elevator system, which switch is closed as long as the car door and the shaft door are closed and remains open as long as the two doors are open. The multiple door contact switches are connected in series within the safety chain, as a result of which the formed safety chain as a whole is closed only when all door contact switches are closed. In this case, the elevator car can be operated for movement because the elevator system assumed that all the car and shaft doors are currently closed. If one door contact switch is opened or not properly closed, the entire safety chain is broken, which prevents the elevator car from moving. The door contact switch on a floor is opened only when the elevator car lands on that floor. This means that passengers waiting in front of an automatically opened shaft door will always find an elevator car to enter.

The safety chain can also include additional switches. For example, a so-called "contact unlocking shaft door switch" (KNET switch) which has a triangular contact can be provided outside of an elevator shaft. The KNET switch is used for maintenance/inspection work on an elevator system in order to be able to manually open a shaft door of the elevator system. If the KNET switch is unlocked, the elevator car is displaced beyond a permissible travel path, for example in the direction of an elevator shaft ceiling or in the direction of an elevator shaft floor. The elevator system can then be set to its inspection operating mode. In contrast with a KTS switch mentioned above, by unlocking the KNET switch a shaft door can be manually opened regardless of where the elevator car is located. If the shaft door is opened, the elevator car is stopped immediately because of the broken safety chain.

A disadvantage of using a KNET switch is that there is often no elevator car waiting behind an open shaft door. Such a dangerous case should always be avoided. Another disadvantage is that it is not always possible to determine whether the shaft doors remain closed all the time. For example, if a service technician operates a KNET switch and opens a shaft door on one floor, during the period in which the safety chain is broken it is impossible for him to know whether another person on another floor has opened another shaft door and entered the shaft, or whether all shaft doors are currently closed properly. There could be a problematic scenario in which a service technician cannot restart the elevator system unless all shaft doors are closed. In this case, he would probably suspect that the elevator now has a problem. A lot of time could then be lost for an unnecessary diagnosis or repair. In addition, the person who is in the elevator shaft will be in a dangerous situation if the service technician travels in the elevator car without noticing the person's presence in the shaft. Furthermore, allocating a KNET switch to each floor results in additional costs and expenses for installation or maintenance of an elevator system.

Among other things, there may be a need, on the one hand, to avoid such a dangerous or problematic scenario and, on the other hand, to be able to easily monitor all shaft doors of an elevator system at any time, in particular during installation and maintenance works.

SUMMARY

Such a need can be met by the subject matter of any of the advantageous embodiments defined in the following description.

According to a first aspect of the invention, a safety monitoring apparatus for an elevator system having a shaft over two or more floors is proposed, with an elevator car being able to travel in the shaft and the shaft having at least one shaft door on each floor. The safety monitoring apparatus comprises a safety circuit that has a door contact switch for each shaft door. The door contact switch can be closed or opened accordingly when the relevant shaft door is closed or opened. The door contact switches can form an electrical series circuit with each other such that, when one of the door contact switches is opened, the safety circuit is electrically broken to block the elevator car from moving. However, the safety circuit is not to be understood as limiting here, since multiple further safety functions and accordingly multiple safety switches associated with the safety functions can also be provided which can be connected to the safety circuit in order to form a safety chain of the elevator system. The safety monitoring apparatus has at least one bypass switch that can actuate a first door contact switch for a first shaft door on a first floor in such a way that, when the elevator car reaches the first floor, the bypass switch bypasses the first door contact switch so that the safety circuit is switched independently of the first door contact switch. The safety monitoring apparatus also has a monitoring means that can monitor the switching state of the safety circuit and/or of a second door contact switch for a second shaft door on a second floor. The monitoring means can be electronic hardware or computer-programmable software, for example. The monitoring means can also be an electronic or electrical signal that represents a current switching state of the door contact switch and can be processed and evaluated by the safety monitoring apparatus or an external data processing unit that can communicate with the safety monitoring apparatus. Then, while the bypass switch bypasses the first door contact switch, the safety circuit can be broken or closed accordingly by opening or closing a second door contact switch in response to the opening or closing of a second shaft door on a second floor.

According to a second aspect of the invention, a method for monitoring the safety of an elevator system having a shaft over two or more floors is provided, with an elevator car being able to travel in the shaft and the shaft having at least one shaft door on each floor. In the method, each shaft door is assigned a door contact switch, as a result of which the shaft door is opened and closed together with the door contact switch. To form a safety circuit, the door contact switches are electrically connected in series with one another, as a result of which the safety circuit is electrically broken when a door contact switch is open in order to block the elevator car from moving. A first door contact switch for a first shaft door on the first floor is bypassed by a bypass switch when the elevator car reaches the first floor, as a result of which the safety circuit is switched independently of the first door contact switch, with the switching state of the safety circuit and/or of a second door contact switch for a second shaft door on a second floor being monitored by a monitoring means.

According to a third aspect of the invention, an elevator system is proposed which has at least one safety monitoring device according to the first aspect of the invention or is monitored by a method according to the second aspect of the invention.

Possible features and advantages of embodiments of the various aspects of the invention can be considered, inter alia and without limiting the invention, as being based on the concepts and findings described below.

According to an advantageous embodiment of the preceding invention, the bypass switch can be fixed to the elevator car. When the elevator car moves past a shaft door in the shaft, the bypass switch can bypass the door contact switch of the shaft door so that this shaft door and the door contact switch are decoupled from one another, i.e. the opening or closing of the shaft door will no longer affect the switching state of the door contact switch.

According to another advantageous embodiment of the preceding invention, the safety monitoring device has a bypass switch for each door contact switch. The bypass switch can be mounted on or near the door contact switch in such a way that the bypass switch can bypass this door contact switch when the elevator car reaches the floor having the shaft door to which this door contact switch is assigned.

According to a further advantageous embodiment of the preceding invention, the elevator car reaches one of the floors when the elevator car lands on the floor or reaches an unlocking zone of the floor. The unlocking zone is in the shaft e.g. above and/or below a floor stopping position of the elevator car on a floor. In this case, the unlocking zones can each be referred to as an entry and exit zone of the floor which the elevator car has to reach before stopping on the floor or after leaving this floor. By means of a sensor system, for example, it is detected whether the elevator car is in the unlocking zone.

A shaft door is usually mechanically locked if there is no elevator car behind it. The unlocking zone is a region which is defined e.g. approximately 20 to 35 cm above and below a defined stopping point of the elevator car in the shaft. If the elevator car travels in this region, a door contact switch is mechanically unlocked by a shaft door so that a safety circuit remains closed despite the open shaft door. This means that the elevator car may let passengers alight promptly at the destination floor and take them away promptly from the starting floor, as a result of which the travel time or the waiting time for passengers can be shortened or optimized.

According to a further advantageous embodiment of the preceding invention, the monitoring means can generate an alarm signal when the safety circuit is broken. Such an alarm signal is for example an electronic, acoustic, visual and/or vibrating signal. The alarm signal can indicate a broken safety circuit and/or a specific shaft door that is open.

According to a further advantageous embodiment of the preceding invention, the monitoring means can communicate in a wired manner or wirelessly with a controller of the elevator system, an external controller and/or a mobile device. Thus, the safety monitoring device can be used e.g. for remote monitoring or diagnostics of an elevator system or can be remotely controlled. An alarm signal generated by the safety monitoring device can be forwarded e.g. to another or an external control device or to a mobile terminal.

According to a further advantageous embodiment of the preceding invention, the safety monitoring device can have a memory unit. An identity of the opened second door contact, the time and/or the duration of the break in the safety circuit can be stored as a log on the memory unit.

According to a further advantageous embodiment of the preceding invention, the safety monitoring device can be interconnected with at least one other safety monitoring device, the safety monitoring devices having the same or different numbers of door contact switches and/or bypass switches. Such a need can exist, for example, when there are multiple elevator cars in a shaft or the shaft is very high and includes many floors.

It should be noted that some of the possible features and advantages of the invention are described herein with reference to different embodiments of the safety monitoring device and of a method for monitoring the working order thereof. A person skilled in the art will recognize that the features can be suitably combined, adapted or replaced in order to arrive at further embodiments of the invention.

Embodiments of the invention will be described below with reference to the accompanying drawings, with neither the drawings nor the description being intended to be interpreted as limiting the invention.

DESCRIPTION OF THE DRAWINGS

FIGS. 2.1 through 2.3: show an elevator system comprising a safety monitoring device according to the invention.

Figure 1:
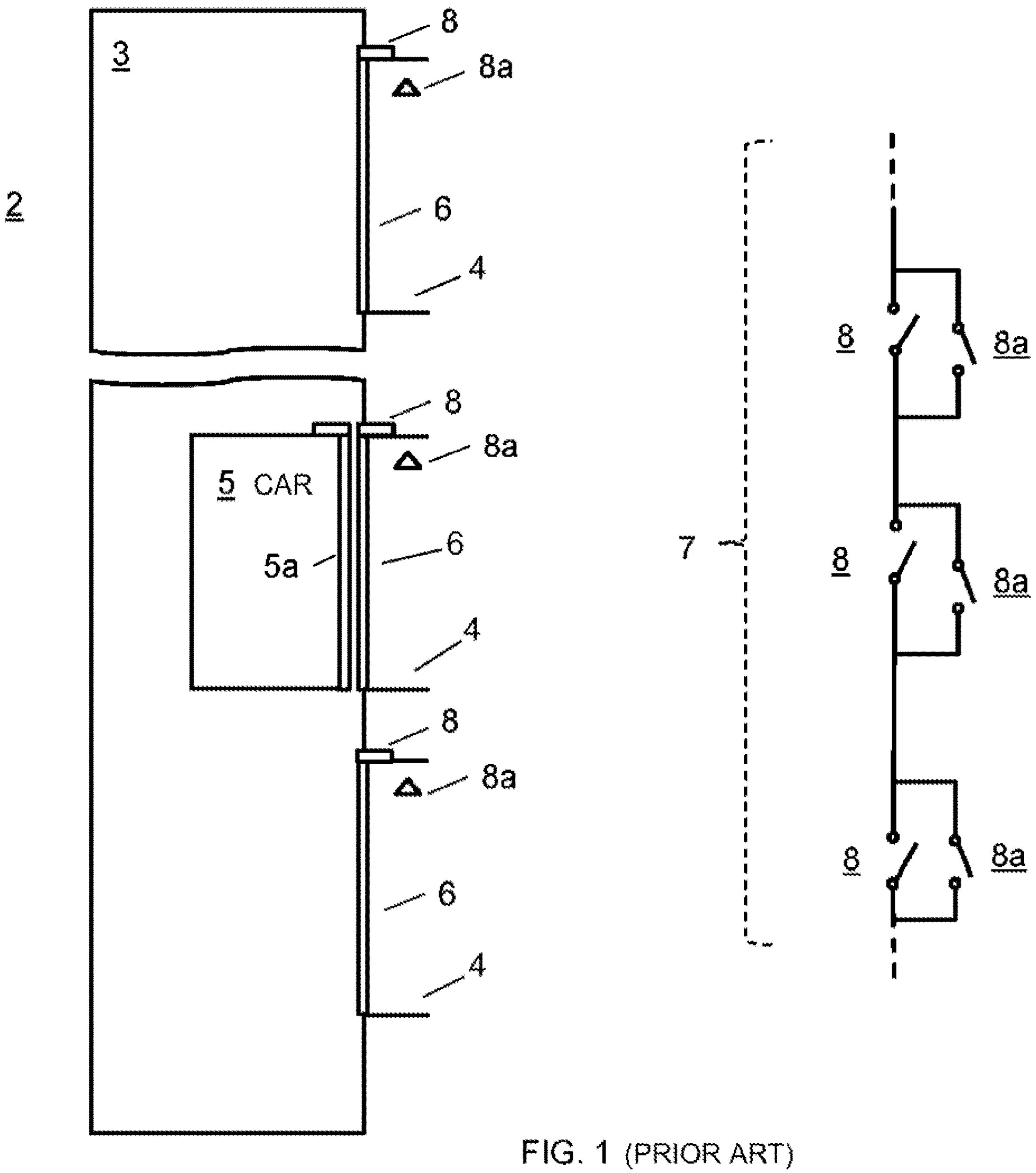
FIG. 1 (PRIOR ART)
FIG. 1: shows a conventional elevator system with a safety chain.

The drawings are merely schematic and not true to scale. Like reference signs denote like or equivalent features in the various drawings.

DETAILED DESCRIPTION

FIG. 1 shows a conventional elevator system 2 which has an elevator car 5 in a shaft 3 having multiple floors 4, with a shaft door 6 being provided on each floor 4. The elevator car 5 has a car door 5*a* which usually always opens and closes simultaneously with a shaft door 6. A door contact switch 8 is provided on each of the shaft doors 6 and on the car door 5*a*. This can be used to monitor whether the relevant shaft or car door is currently properly closed or open. The door contact switch 8 is also closed or opened accordingly when the shaft door 6 is closed or opened. All the door contact switches 8 are electrically connected in series and thus form a safety chain 7 of the elevator system 2.

The safety chain 7 is shown next to the elevator system 2 in a simplified schematic representation. The safety chain 7 is used to monitor a switching state of each door contact switch 8. If one of the door contact switches 8 is opened, the entire safety chain 7 is broken, as a result of which the elevator car 5 is immediately blocked, regardless of whether it is moving or ready to move at that moment.

A KNET switch **8*a* is provided outside the shaft 3 on each floor 4. Such a KNET switch 8*a* can be switched with a special key in order to unlock or lock a door contact switch 8 of a shaft door 6 so that the shaft door 6** can be opened or closed manually.

In such an elevator system 2, however, it is not possible to monitor, during a stoppage of an elevator car 5 on a floor 4, whether another shaft door 6 on another floor is open or has been opened in the meantime. This could trigger a dangerous situation, in particular during maintenance work, if the elevator car 5 with an open shaft door 6 and the car door **5*a* is waiting for a first service technician on a floor 4, but a second service technician has opened another shaft door 6 using a KNET switch 8*a* on another floor and has entered the shaft 3, e.g. the shaft pit, after which he has closed this shaft door 6 again. In this case, a journey by the elevator car 5 could endanger the second service technician in the shaft 3**.

FIGS. 2.1 to 2.3 each show a safety monitoring apparatus 1 according to the invention for an elevator system 2 shown above. A KNET switch is no longer required for this elevator system 2. The safety monitoring apparatus 1 comprises a safety circuit 7, which corresponds to the safety chain 7 in FIG. 1. In this embodiment, the safety monitoring apparatus 1 has a bypass switch 9 which is fixed e.g. to the elevator car 5. As an alternative to this, a bypass switch 9 can be mounted in the shaft 3 next to each door contact switch 8. The bypass switch 9 and a door contact switch 8 can interact in such a way that, when the elevator car 5 reaches a floor 4 and passes the bypass switch 9, the elevator car 5 can activate the bypass switch 9 to bypass a door contact switch 8, as a result of which the corresponding shaft door 6 and the door contact switch 8 are decoupled. In this case, the entire safety circuit 7 remains electrically closed, even if this shaft door 6 is open. A monitoring means 10 of the safety monitoring apparatus 1 monitors the switching state of the safety circuit 7 and/or of a door contact switch 8. The monitoring means 10 can be an electronic control unit. There is also a possibility that the monitoring means 10 is a physical parameter or an electrical signal that represents a switching state of a door contact switch 8 when considering a measuring point in the safety circuit 7 and measuring the parameter or the signal at this measuring point. The monitoring means 10 can communicate with an elevator-internal or elevator-external controller 14 and a mobile device 15 in order to further transmit a monitoring result. This communication can be over a wired or wireless connection.

FIG. 2.1 shows that the safety monitoring apparatus 1 according to the invention with a closed safety circuit 7 when the elevator car 5 moves between floors 4 e.g. in a normal operating mode. In this case, nowhere is a door contact switch 8 of the shaft door 6 bypassed by the bypass switch 9.

FIG. 2.2 shows that the safety monitoring apparatus 1 keeps the safety circuit 7 closed while a shaft door 6 is open. When the elevator car 5 lands on a destination or intermediate destination floor, a first door contact switch **8*a* is opened by simultaneously opening a first shaft door 6*a* on this floor 4. Since the opened door contact switch 8*a* is bypassed by the bypass switch 9, there is a continuous current path (not shown) along the safety circuit 7 via the bypass switch 9. Since the car door 5*a* and the respective shaft doors 6 are always closed or opened simultaneously, the car door 5*a* is also bypassed when the relevant shaft door 6** is bypassed.

If a second shaft door **6*b* on a second floor 4*b* is opened by someone else, the safety circuit 7 is broken because a second door contact switch 8*b* is opened. In this case, an alarm signal 12 is generated by the monitoring means 10 in order to warn a service technician (not shown) about the safety circuit 7 being broken. The alarm signal 12 can be sent as an electronic, acoustic, optical and/or vibrating signal and can also be sent to a mobile device (e.g. smartphone) 15 of the service technician in front of or in the elevator car 5. It can also be determined which door contact switch 8 or which shaft door 6** has been opened.

A memory unit 13 of the safety monitoring device 1 is provided, on which a number or identity of the opened second door contact switch **8*b*, the time and the duration of the break of the second door contact switch 8*b* or the safety circuit 7 can be stored as a log. It is then possible to conclude that there is a technical fault or unauthorized entry into the shaft 3**.

FIG. 2.3 shows that there is an unlocking zone 11 in the shaft 3 which is close to a floor stopping position of the elevator car 5 with respect to the relevant floor 4 and is typically approximately 20 to 35 cm above and below the floor stopping position. Depending on whether the elevator car 5 is reaching or leaving a floor 4, the unlocking zone 11 can also be designated as an entry or exit zone. A sensor system or a position determination is used to determine whether the elevator car 5 is in the unlocking zone. For example, information about a current position of the elevator car 5 in the shaft 3 can be determined using a magnetic tape extending vertically along the shaft 3 and a magnetic tape reader mounted on the elevator car 5.

When the elevator car 5 travels into the unlocking zone 11 and the elevator car 5 is thus very close (e.g. <30 cm) to a floor stopping position, a corresponding door contact switch **8*a* of the shaft door 6*a* is unlocked so that the shaft door 6*a* can be opened before the elevator car 5 actually reaches its floor stopping position. Accordingly, the elevator car 5 may already start moving with an open or half-closing shaft door 6*a*. In this case, the open door contact switch 8*a* is bypassed by the bypass switch 9, and the safety circuit 7 remains closed. The experience of traveling with the elevator system 2 can thus be optimized, e.g. leveling of a landing for the elevator system 2** can be provided in order to accelerate door opening processes in this way and reduce the length of stay on the floor.

Finally, it should be noted that terms such as "comprising," "having," etc., do not preclude other elements or steps and terms such as "a" or "an" do not preclude a plurality. Furthermore, it should be noted that features or steps which have been described with reference to one of the above embodiments may also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A safety monitoring apparatus for an elevator system, the elevator system having a shaft extending over at least two floors, an elevator car adapted to travel in the shaft and the shaft having at least one shaft door on each of the floors, the safety monitoring apparatus comprising:

a safety circuit including a door contact switch for each of the shaft doors, each of the door contact switches being closed or opened accordingly when an associated one of the shaft doors is closed or opened;

wherein the door contact switches are connected to form an electrical series circuit such that, when one of the door contact switches is opened, the safety circuit is electrically broken to block the elevator car from moving;

at least one bypass switch adapted to bypass a first of the door contact switches at a first of the shaft doors on a first of the floors such that, only when the elevator car reaches the first floor, the bypass switch bypasses the first door contact switch to make the safety circuit switchable by the door contact switches other than the first door contact switch and independently of the first door contact switch; and a monitoring means that monitors at least one of a switching state of the safety circuit and a switching state of a second of the door contact switches at a second of the shaft doors on a second of the floors.

2. The safety monitoring apparatus according to claim 1 wherein, while the bypass switch bypasses the first door contact switch, the safety circuit can be electrically broken or closed accordingly by opening or closing the second door contact switch in response to the opening or closing of the second shaft door on the second floor.

3. The safety monitoring apparatus according to claim 1 wherein the bypass switch is fixed to the elevator car.

4. The safety monitoring apparatus according to claim 1 including an individual one of the bypass switch associated with each one of the door contact switches, each of the bypass switches being mounted relative to the associated door contact switch such that the bypass switch bypasses the associated door contact switch when the elevator car reaches a one of the floors having the shaft door to which the associated door contact switch is assigned.

5. The safety monitoring apparatus according to claim 1 wherein the elevator car reaches one of the floors when the elevator car lands on the one floor or reaches an unlocking zone of the one floor, the unlocking zone located at least one of above and below a floor stopping position of the elevator car at the one floor in the shaft, and wherein in the unlocking zone the bypass switch bypasses the door contact switch at the one floor.

6. The safety monitoring apparatus according to claim 1 wherein the monitoring means generates an alarm signal when the safety circuit is broken.

7. The safety monitoring apparatus according to claim 1 including a memory unit that stores as a log an identity of the second door contact when opened and at least one of a time and a duration of a break in the safety circuit.

8. The safety monitoring apparatus according to claim 1 wherein the monitoring means communicates with at least one of an elevator-internal controller of the elevator system, an elevator-external controller of the elevator system, an external controller and a mobile device.

9. The safety monitoring apparatus according to claim 1 including an interconnection with at least one other safety monitoring apparatus, the at least one other safety monitoring apparatus having a same or different numbers of the door contact switches and/or the bypass switch as the safety monitoring apparatus.

10. An elevator system comprising:

a shaft extending over at least two floors;

an elevator car adapted to travel in the shaft;

wherein the shaft has at least one shaft door on each of the floors; and the safety monitoring apparatus according to claim 1 monitoring the elevator system.

11. A method for monitoring a safety of an elevator system having a shaft extending over at least two floors, wherein an elevator car is adapted to travel in the shaft and the shaft has at least one shaft door on each of the floors, the method comprising the steps of:

assigning a door contact switch to each of the shaft doors, wherein when one of the shaft doors is opened and closed the assigned door contact switch is opened and closed;

forming a safety circuit by electrically connecting the door contact switches in series, wherein the safety circuit is electrically broken when one of the door contact switches is open thereby blocking the elevator car from moving;

bypassing a first of the door contact switches assigned to a first of the shaft doors on a first of the floors by a bypass switch when the elevator car reaches the first floor resulting in the safety circuit being switched by the door contact switches other than the first door contact switch and independently of the first door contact switch; and monitoring by a monitoring means at least one of a switching state of the safety circuit and switching state of a second of the door contact switches assigned to a second of the shaft doors on a second of the floors.

12. The method according to claim 11 wherein, while the first door contact switch is bypassed, the safety circuit is broken or closed accordingly by opening or closing the second door contact switch in response to opening or closing of the second shaft door on a second floor.

13. The method according to claim 11 wherein the elevator car reaches each of the floors by the elevator car landing on the floor or the elevator car reaching an unlocking zone of the floor, wherein the unlocking zone is above and/or below a floor stopping position of the elevator car at the floor in the shaft, and wherein in the unlocking zone the bypass switch bypasses the door contact switch assigned to the floor.

14. The method according to claim 11 including generating an alarm signal when the safety circuit is broken.

15. The method according to claim 11 including storing as a log at least one of an identity of the opened second door contact switch, a time of break in the safety circuit and a duration of the break in the safety circuit.

16. An elevator system comprising:

a shaft extending over at least two floors;

an elevator car adapted to travel in the shaft;

wherein the shaft has at least one shaft door on each of the floors; and a safety monitoring apparatus monitoring the elevator system by the method according to claim 11.

* * * * *